G. F. Wilson.
Drying Acid Phosphates.

No. 75330.      Patented Mar. 10, 1868.

WITNESSES.
William Hedge
Winslow Warren Jr

INVENTOR:
Geo. F. Wilson

G F Wilson
Drying Acid Phosphates
N° 75330   Patented March 10 1868
Sheet 2.
2 Sheets.

WITNESSES.
William Hedge
Winslow Warren Jr

INVENTOR.
Geo. F. Wilson

United States Patent Office.

GEORGE F. WILSON, OF EAST PROVIDENCE, RHODE ISLAND.

Letters Patent No. 75,330, dated March 10, 1868.

IMPROVEMENT IN DRYING ACID PHOSPHATES.

The Schedule referred to in these Letters Patent and making part of the same.

TO ALL WHOM IT MAY CONCERN:

Be it known that I, GEORGE F. WILSON, of East Providence, in the county of Providence, and State of Rhode Island, have invented a new and improved Mode of Drying Acid Phosphate of Lime as prepared under Horsford's patents; and I do hereby declare that the following is a full and exact description thereof, reference being had to the accompanying drawings, and to the letters of reference marked thereon.

The object of this my invention is to provide a continuous and economical drier, by means of which the acid phosphate of lime, made substantially in accordance with the patents of E. N. Horsford, above referred to, and granulated according to the method described in the application for a patent of George F. Wilson, bearing even date therewith, may, by artificial heat, be rendered sufficiently brittle to be readily reduced to powder.

I have dried the acid on cloth scrays, so arranged in an apartment that a current of air must sweep over the surface of the acid. By changing the relative position of the scrays from time to time, so as to bring them at last into the most heated and freshest atmosphere, this method proved successful. I have also dried the acid on open scrays exposed to the sun, and on endless aprons in a chamber of heated air. But the arrangement I prefer for obtaining a continuous current of dry, heated air is the following:

It consists essentially of a chamber through which slowly circulates a current of highly-heated air, in which chamber are maintained numerous wide, thin vertical sheets of granulated acid phosphate of lime, mixed with farinaceous matter, supported each by two parallel frames of lattice-work one and a quarter inch apart, extending from top to bottom of the chamber, so arranged that at intervals a quantity of dried acid is discharged at the bottom, and a corresponding quantity of fresh acid received at the top. The accompanying diagrams illustrate the relations of the parts of the apparatus and their modes of action.

Figure 1:
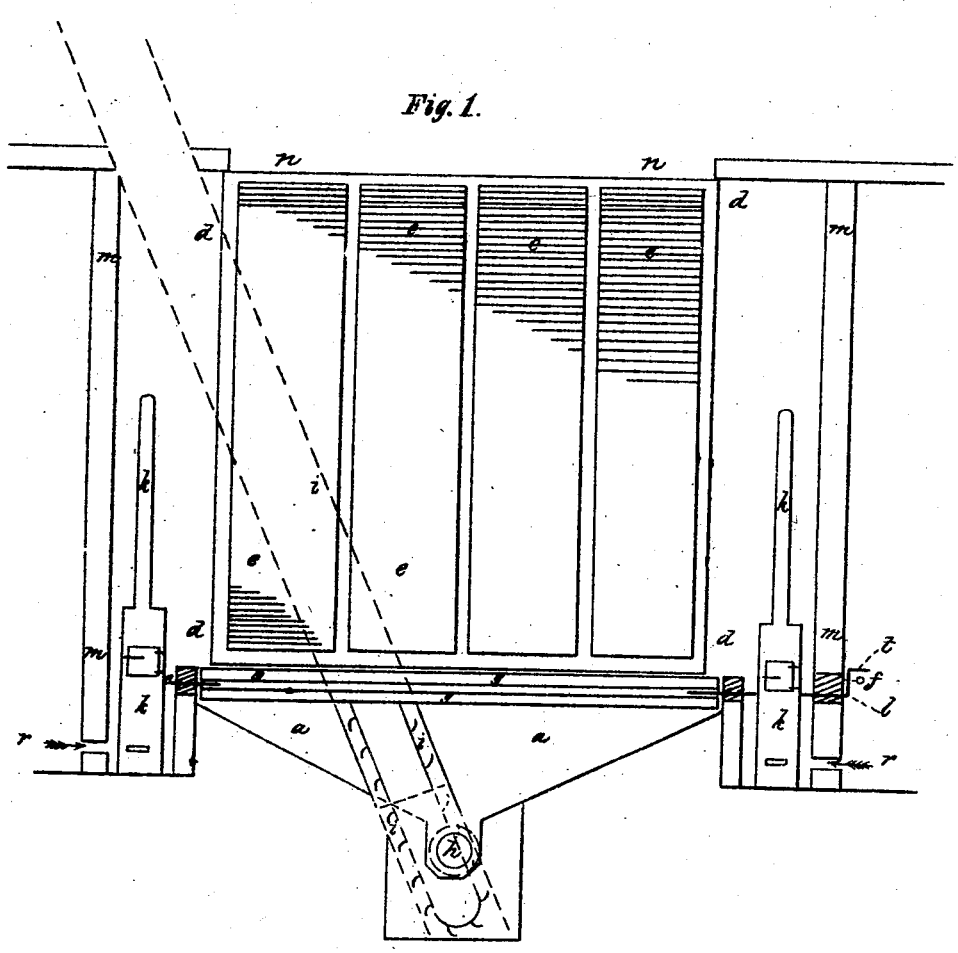
Figure 2:
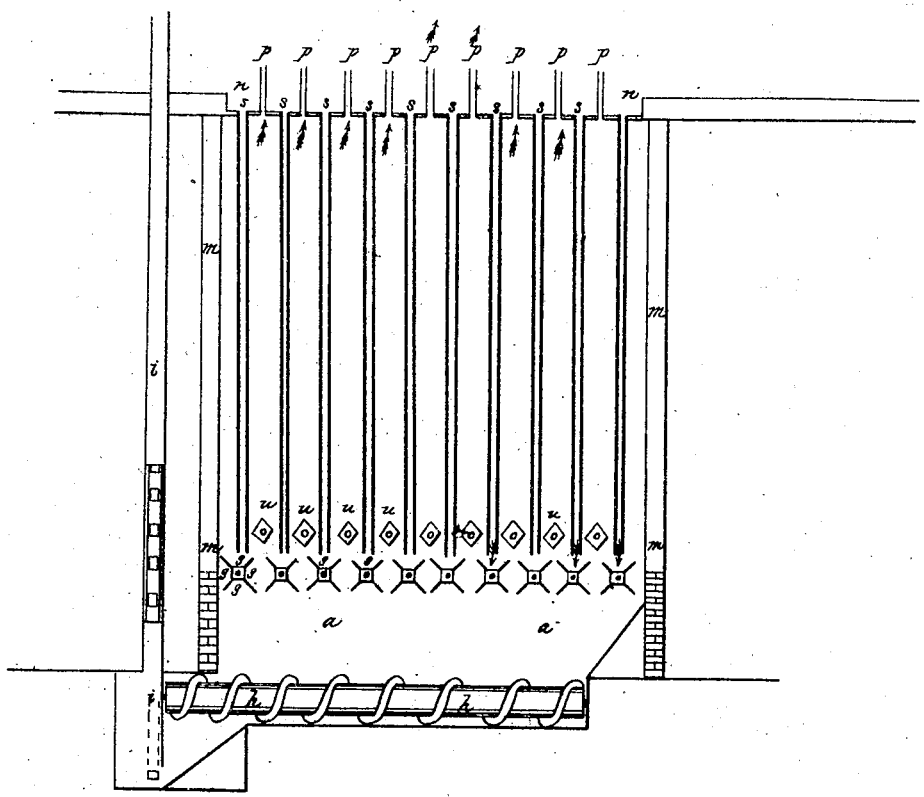
Figure 3:

Figure 1 is a view of one side of the chamber, or a vertical section.
Figure 2 presents a view at right angles to that in fig. 1, also a vertical section.
Figure 3 shows the construction of a single lattice-frame.

The lattice-work shown in fig. 1, e e e e, and in fig. 3, e' e' e' e', consists of narrow slats with parallel bevelled edges fastened to the upright frames d d d d, the slats having an inclination to the horizon of about forty-five degrees. Two such lattice-frames face each other like two window-blinds, with an interval of an inch and a quarter between the frames, and shown in fig. 3, as mentioned above, and the slats of both inclining downward and toward the intervening space.

In fig. 2, which exhibits an end view of the lattice-frames, are shown end views of a series of revolving troughs, there being one placed under each pair of lattice-frames to receive the acid as it passes through it. The lattice-work in detail is exhibited in fig. 3, which presents a section at right angles to its horizontal length. The troughs g g g g are also given.

In fig. 1, at l l, is the iron axle, by means of which, through the crank t, the trough is revolved, and the pin f, by which the measure of movement of the trough is limited to one quarter of a revolution at each interval. a a represents the hopper, into which the dried acid discharged from the troughs is received, and along the bottom of which it is conducted by a screw-worm, h h, to be emptied into the box at the foot of the elevator i i i. m m m m are brick walls enclosing the chamber. k k are the stoves and pipes for heating. At u u, &c., are steam-pipes, fulfilling the same office, and protected by tin shields from the dry acid. n n is the recess in the floor above, in which the granulated acid to be dried is received. r r are openings for the admission of fresh air to be heated by the stoves and pipes k k, or by the coils of steam-pipes u u, &c. p p are iron tubes for the escape of the air charged with moisture from the drying acid. i i i is an elevator for conveying the dried acid to the floor above.

The mode of operating the drier is as follows: The stoves having been fired, or the steam admitted to the coils, or both, dried granulated acid is received in the receptacle n n, and the material distributed in the flues between the lattice-frames till the lattices are filled, and the troughs g g, having the position indicated in fig. 3, first filling, and then preventing the further downward passage of the acid. The trough is then quickly revolved in the direction of the arrow, fig. 3, from e to b, through a quarter of a revolution, bringing the side c into the position occupied at the outset by b. As the support at the bottom of the column is withdrawn, by placing under it an empty trough, the column of acid drops to fill the trough, leaving an empty space at the top. This is at once filled from the supply of fresh undried acid in n n. After allowing the column to remain a certain length of time, the trough is revolved through another quarter of a revolution; the column of granulated acid drops; a vacant space reappears at the top, which is again filled with fresh acid.

By repeating these movements, with sufficient intervals to secure the thorough drying of the acid before it reaches the bottom, the process is complete and continuous. As each trough is emptied, the carrier or screw-worm moves the dried acid forward to the foot of the elevator, where it is caught and removed to the apartment above.

What I claim, and desire to secure by Letters Patent of the United States, is—

1. My improved process of drying the granulated acid phosphate of lime by exposing the same to continuous currents of heated air on both sides of the columns thereof, substantially as and for the purposes described.

2. The application of the improved apparatus, constructed and operated substantially as described for the purpose aforesaid.

3. The arrangement of the revolving troughs, or their equivalent, combined with the vertical lattice-flues, substantially as above described, by which the process of drying is rendered uniform and continuous.

GEO. F. WILSON.

Witnesses:
  WILLIAM HEDGE,
  WINSLOW WARREN, Jr.